US012776563B2

(12) United States Patent
Lynch et al.

(10) Patent No.: US 12,776,563 B2
(45) Date of Patent: Oct. 27, 2026

(54) ELECTRONIC DEVICE WITH ANTENNA OVERLAPPING INACTIVE DISPLAY REGION

(71) Applicant: Apple Inc., Cupertino, CA (US)

(72) Inventors: Charles A Lynch, Austin, TX (US); Panagiotis Theofanopoulos, Cupertino, CA (US); Subramanian Ramalingam, San Jose, CA (US); Forhad Hasnat, Milpitas, CA (US); Jiangfeng Wu, San Jose, CA (US); Yi Jiang, Cupertino, CA (US); Siwen Yong, San Francisco, CA (US); Rodney A Gomez Angulo, Santa Clara, CA (US); Alden Fisher, Austin, TX (US); Kourosh Khanjani, Los Gatos, CA (US); Zhe Zhang, Santa Clara, CA (US); David Garrido Lopez, San Jose, CA (US); Paula Fernandez Martinez, Madrid (ES); Harish Rajagopalan, San Jose, CA (US); Jibi Jose Mathew, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 18/733,744

(22) Filed: Jun. 4, 2024

(65) Prior Publication Data

US 2025/0372861 A1 Dec. 4, 2025

(51) Int. Cl.
*H01Q 1/22* (2006.01)
*H01Q 5/357* (2015.01)
*H01Q 13/10* (2006.01)

(52) U.S. Cl.
CPC ............... *H01Q 1/22* (2013.01); *H01Q 5/357* (2015.01); *H01Q 13/10* (2013.01)

(58) Field of Classification Search
CPC ............ H01Q 1/22; H01Q 1/44; H01Q 1/243; H01Q 5/357; H01Q 13/10; H01Q 13/18
See application file for complete search history.

(56) References Cited

U.S. PATENT DOCUMENTS 10,177,447 B2 1/2019 Jiang et al.
10,200,105 B2 2/2019 Hu et al.
10,608,321 B2 * 3/2020 Jiang ...................... H01Q 1/528
10,734,708 B2 * 8/2020 Yong .................... H01Q 9/0407
10,854,953 B2 * 12/2020 Romano ............... H04M 1/026
(Continued)

FOREIGN PATENT DOCUMENTS

WO WO-2023068581 A1 * 4/2023 ............... H01Q 1/48

*Primary Examiner* — Seokjin Kim
(74) *Attorney, Agent, or Firm* — Treyz Law Group, P.C.; Michael H. Lyons

(57) ABSTRACT

An electronic device may be provided with a sidewall, a rear wall, a cover layer mounted to the sidewall, and a display panel mounted to the cover layer. A conductive mesh may be layered onto the cover layer within a gap between the panel and the sidewall. The device may include an antenna with a radiating cavity and a radiating slot overlapping the radiating cavity. The radiating slot may have opposing edges defined by the conductive mesh and the display panel. The radiating cavity may have edges defined by the sidewall, the display panel, the conductive mesh, the rear wall, and an air loop gasket. The radiating cavity and the radiating slot may be fed by a coplanar waveguide that overlaps the radiating slot.

20 Claims, 9 Drawing Sheets

(56) References Cited

U.S. PATENT DOCUMENTS

| | | | | |
|---|---|---|---|---|
| 10,978,806 | B2 | 4/2021 | Garrido Lopez et al. | |
| 2019/0007120 | A1* | 1/2019 | Hu | H01Q 9/0421 |
| 2019/0097306 | A1* | 3/2019 | Romano | H01Q 13/10 |
| 2020/0280133 | A1* | 9/2020 | Avser | H01Q 5/42 |
| 2021/0013626 | A1* | 1/2021 | Jang | H01Q 1/2258 |
| 2022/0278445 | A1* | 9/2022 | Woo | H01Q 9/045 |
| 2023/0083466 | A1* | 3/2023 | Li | H01Q 13/10 343/720 |

* cited by examiner

ELECTRONIC DEVICE WITH ANTENNA OVERLAPPING INACTIVE DISPLAY REGION

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures. At the same time, there is a desire for wireless devices to cover a growing number of communications bands. In addition, to optimize user experience, it is often desirable for the viewing area of a display in an electronic device to be as large as possible.

Because antennas have the potential to interfere with each other and with components in a wireless device such as displays, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth while still allowing the device to exhibit a compact form factor.

SUMMARY

An electronic device may be provided with wireless circuitry and a housing. The housing may include peripheral conductive housing structures and a rear housing wall. The electronic device may include a display. The display may include a display cover layer mounted to the peripheral conductive housing structures opposite the rear housing wall. The display may include a display panel mounted to the display cover layer. The display panel may be laterally separated from the peripheral conductive housing structures by a gap. A conductive mesh may be layered onto the display cover layer within the gap.

The wireless circuitry may include an antenna. The antenna may have a radiating cavity and a radiating slot overlapping the radiating cavity. The radiating slot may have opposing edges defined by the conductive mesh and the display panel. The radiating cavity may have edges defined by the peripheral conductive housing structures, the display panel, the conductive mesh, the rear housing wall, and an air loop gasket. The radiating cavity and the radiating slot may be fed by a coplanar waveguide that overlaps the radiating slot.

DETAILED DESCRIPTION

Figure 1:
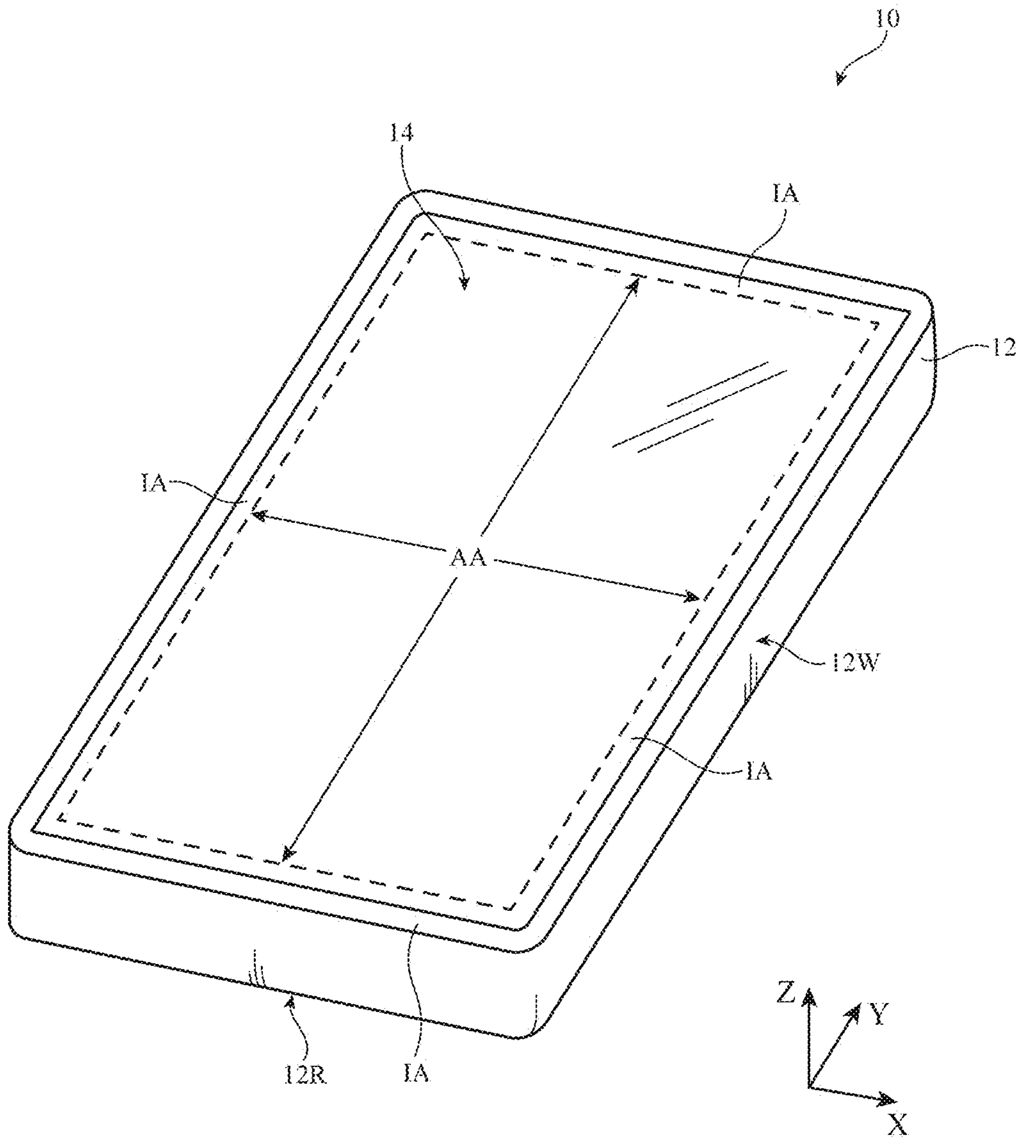
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment. Implementations in which device 10 is a tablet computer are described herein as an example.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, include a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. In some implementations, rear housing wall 12R includes a metal rear wall of device 10. If desired, rear housing wall 12R may include a planar metal layer covered by a thin layer or coating of dielectric such as glass, plastic, sapphire, or ceramic (e.g., a dielectric cover layer). In some implementations, housing 12 may have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. The width may be equal to the length if desired (e.g., in implementations where device 10 has a square shape or outline). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Device 10 may include sensors (e.g., a camera, an ambient light sensor, an infrared-based facial recognition sensor, etc.) overlapping inactive area IA of display 14. If desired, inactive area IA may include a recessed region (not shown) such as a notch or floating island that extends into active area AA and that is surrounded on three or more (e.g., all) sides by active area AA. Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable implementation, the display cover layer may cover substantially all of the front face of device 10 or only a portion of the front face of device 10. Openings may be formed in the display cover layer. For example, an opening may be formed in the display cover layer to accommodate a button, a speaker port, a microphone port, a camera, other sensors, etc. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. If desired, housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). A conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for communications circuitry such as antennas within device 10. For example, active area AA of display 14 may include conductive structures that can block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

Device 10 may, for example, include one or more antennas that are aligned with inactive area IA of display 14. These antennas may radiate through display 14 and may provide wireless coverage for device 10 across the hemisphere over the front face of device 10. Different antennas in device 10 may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
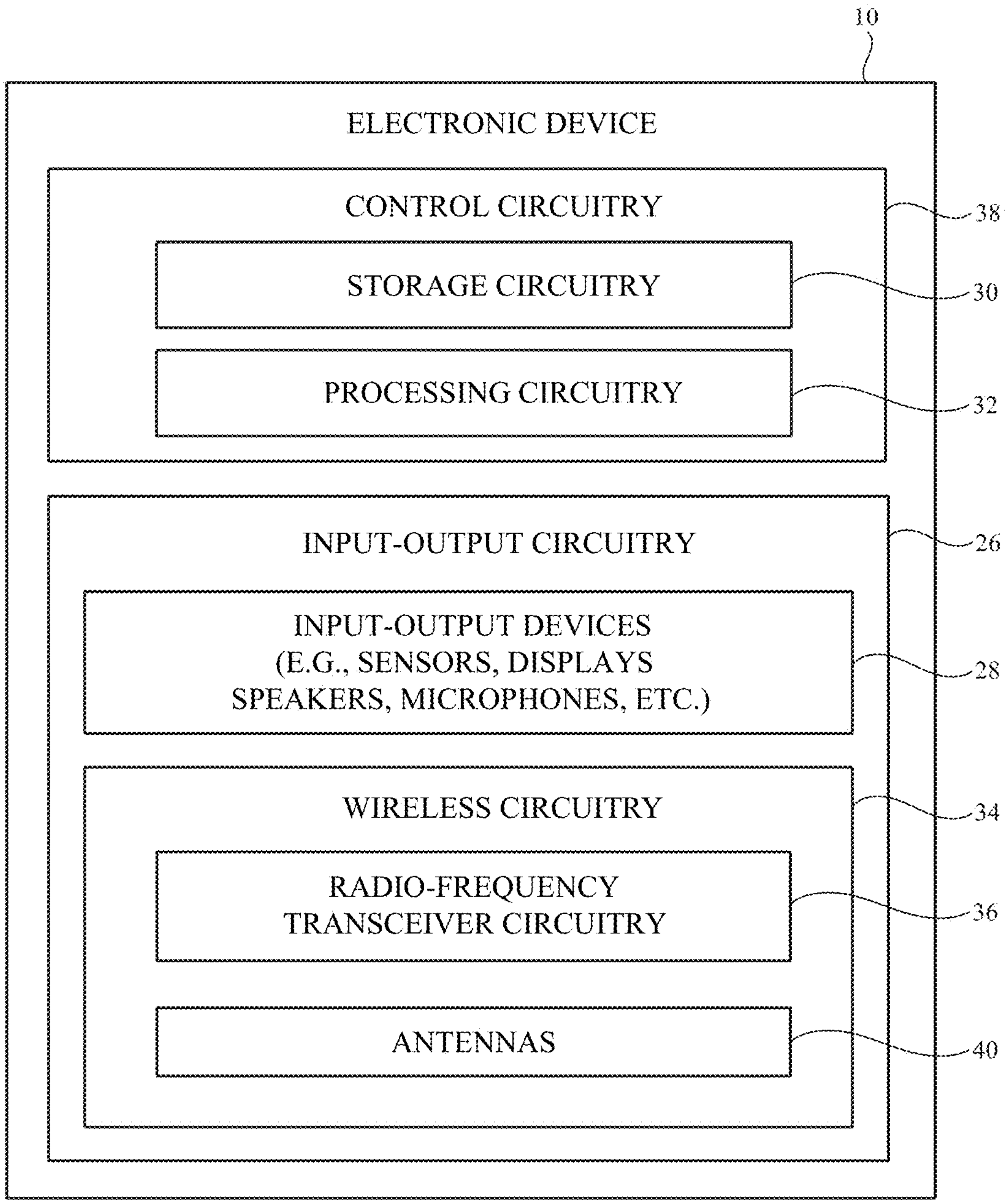
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as “bands”). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, 6G bands at sub-THz frequencies between around 100 GHz and around 10 THz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHZ), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHZ, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term “convey radio-frequency signals” as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
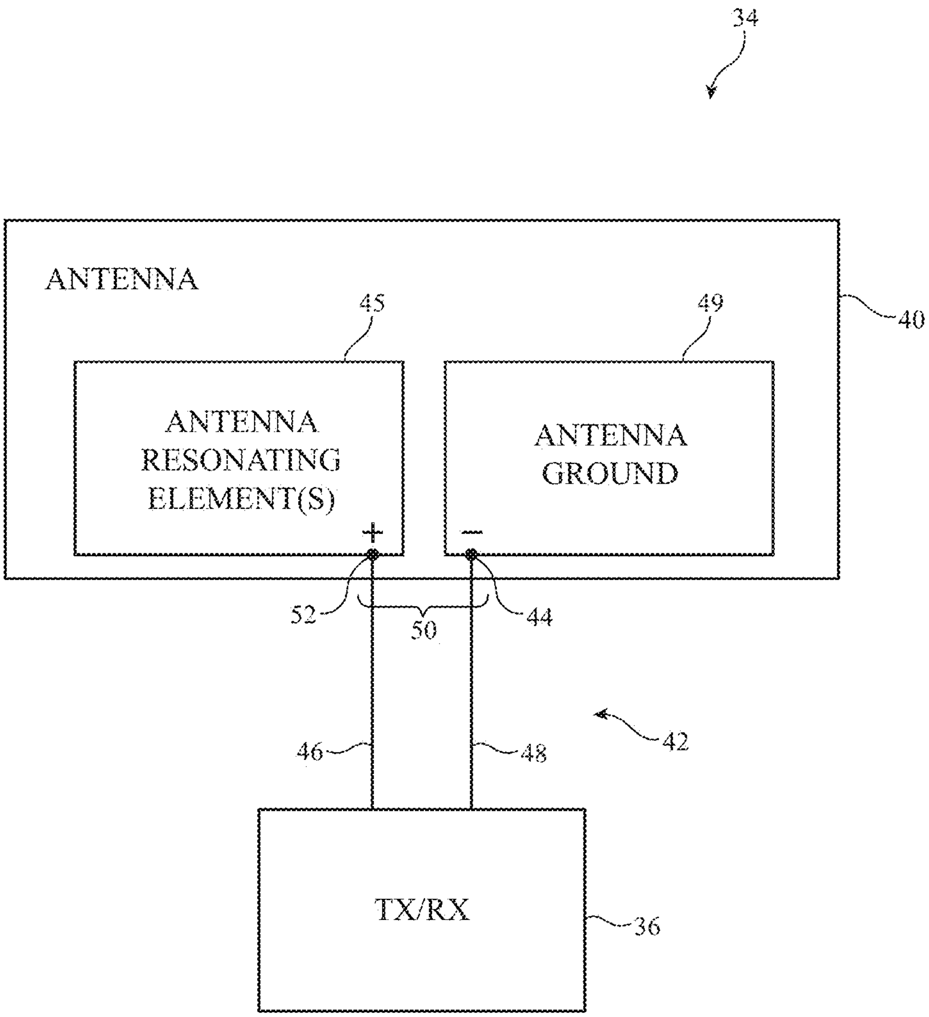
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

If desired, transmission line path 42 may indirectly feed antenna 40. In these implementations, signal conductor 46 may overlap antenna resonating element 45 and may induce and/or excite antenna current on antenna resonating element 45 and/or antenna ground 49 via near-field electromagnetic coupling. In some of these implementations, transmission line path 42 may include a coplanar waveguide. When implemented as a coplanar waveguide, signal path 46 is formed from a first conductive trace and ground conductor 48 includes two conductive ground traces extending on either side of and coplanar with the first conductive trace. In general, any desired feeding scheme may be used for antenna 40.

Figure 4:
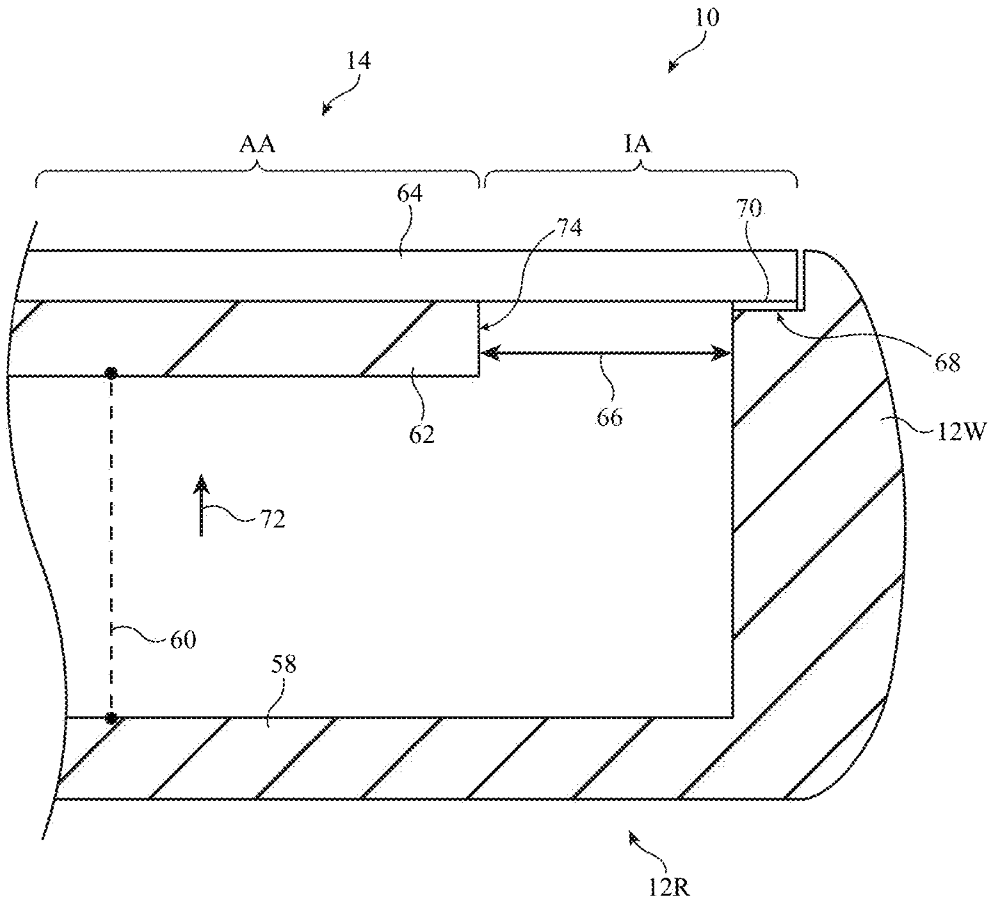
FIG. 4 is a cross-sectional side view of an illustrative electronic device including housing and display structures that may be used in forming antennas in accordance with some embodiments.

If desired, conductive electronic device structures such as conductive portions of housing 12 and conductive portions of display 14 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display panel 62. Display panel 62 may include conductive display structures such as pixel circuitry, touch sensor circuitry, force sensor circuitry, a conductive display frame, conductive shielding structures, a conductive display support plate, a conductive display bracket, ground traces, and/or any other desired circuitry that form and/or overlap active area AA of display 14. Display panel 62 is sometimes also referred to herein as display module 62 or as conductive display structures 62.

Display 14 may include a dielectric cover layer such as display cover layer 64 that overlaps display panel 62. Display cover layer 64 may include plastic, glass, sapphire, ceramic, and/or any other desired dielectric materials. Display panel 62 may emit image light and may receive sensor input (e.g., touch and/or force sensor input) through display cover layer 64 (e.g., within active area AA).

Display cover layer 64 and display 14 may be mounted to peripheral conductive housing structures 12W. For example, as shown in FIG. 4, display cover layer 64 may be mounted to a ledge 68 of peripheral conductive housing structures (sometimes also referred to herein as datum 68) using a ring or layer of adhesive 70 (e.g., pressure sensitive adhesive). Display panel 62 has a peripheral edge 74 that is laterally separated from peripheral conductive housing structures 12W by gap 66 (sometimes also referred to herein as aperture 66, notch 66, or slot 66). The lateral area of display 14 that does not overlap display module 62 (e.g., gap 66) may form inactive area IA of display 14. Since display panel 62 does not overlap gap 66 or inactive area IA, display 14 does not emit light within inactive area IA. Gap 66 may follow a ring-shaped path to laterally surround display panel 62 in device 10 if desired.

As shown in FIG. 4, rear housing wall 12R may be mounted or coupled to peripheral conductive housing structures 12W (e.g., opposite display 14). Rear housing wall 12R may include a conductive layer 58. Conductive layer 58 is sometimes also referred to herein as conductive plate 58, conductive rear wall 58, conductive wall 58, conductive rear housing wall 58, or conductive support plate 58. Conductive rear wall 58 may be coupled to peripheral conductive housing structures 12W or conductive rear wall 58 and peripheral conductive housing structures 12W may be formed from different portions of a single integral piece of metal (e.g., in a unibody configuration).

Conductive rear wall 58 may extend across an entirety of the width of device 10 (e.g., between the left and right edges of device 10 as shown in FIG. 1). If desired, one or more components in device 10 may be supported by or mounted to conductive rear wall 58 within the interior of device 10 (e.g., logic boards such as a main logic board, a battery, a speaker, a camera, a ringer or haptic engine, etc.). Conductive rear wall 58 may contribute to the mechanical strength of device 10 (e.g., to prevent external twisting or bending forces from damaging device 10). Conductive rear wall 58 may be formed from metal (e.g., stainless steel, aluminum, titanium, etc.), for example. If desired, rear housing wall 12R may include a dielectric cover layer (not shown) layered onto the exterior surface of conductive rear wall 58.

Conductive structures in device 10 such as conductive structures in display panel 62, peripheral conductive housing structures 12W, and/or conductive rear wall 58 may be used to form antenna structures (e.g., some or all of antenna resonating element 45 and/or antenna ground 49 of FIG. 3) for one or more of the antennas 40 in device 10. The antenna(s) 40 may overlap and/or be aligned with gap 66 for conveying radio-frequency signals through inactive area IA of display 14 (e.g., without the radio-frequency signals being blocked by display panel 62).

Device 10 may include one or more conductive interconnect structures such as conductive interconnect structure 60. At least some of the conductive display structures in display panel 62 may be held at a ground potential. Conductive interconnect structure 60 may electrically couple conductive rear wall 58 to grounded conductive structures in display panel 62 and/or to other grounded components in device 10 so that each of these elements are held at the same ground potential (e.g., a system ground potential). This may allow some or all of these structures to form part of the antenna ground 49 for an antenna 40 (FIG. 3) and/or part of a radiating slot for the antenna.

Conductive interconnect structure 60 may sometimes also be referred to herein as grounding structure 60, grounding interconnect structure 60, vertical grounding structure 60. Or simply as conductive interconnect 60. Conductive interconnect structure 60 may include an air loop gasket (ALG) (e.g., a gasket formed from conductive fabric surrounding an air pocket or cavity within the gasket), conductive traces, a conductive pin, a conductive spring (e.g., a y-spring or spring finger), a conductive prong (e.g., conductive blades that mate with conductive spring fingers such as y-springs), a conductive bracket, a conductive screw, a conductive clip, conductive tape, a conductive wire, a conductive trace, conductive foam, conductive adhesive, solder, welds, metal members (e.g., sheet metal members), contact pads, conductive vias, conductive portions of one or more components mounted to conductive rear wall 58, an interior conductive housing wall, and/or any other desired conductive interconnect structures.

Figure 5:
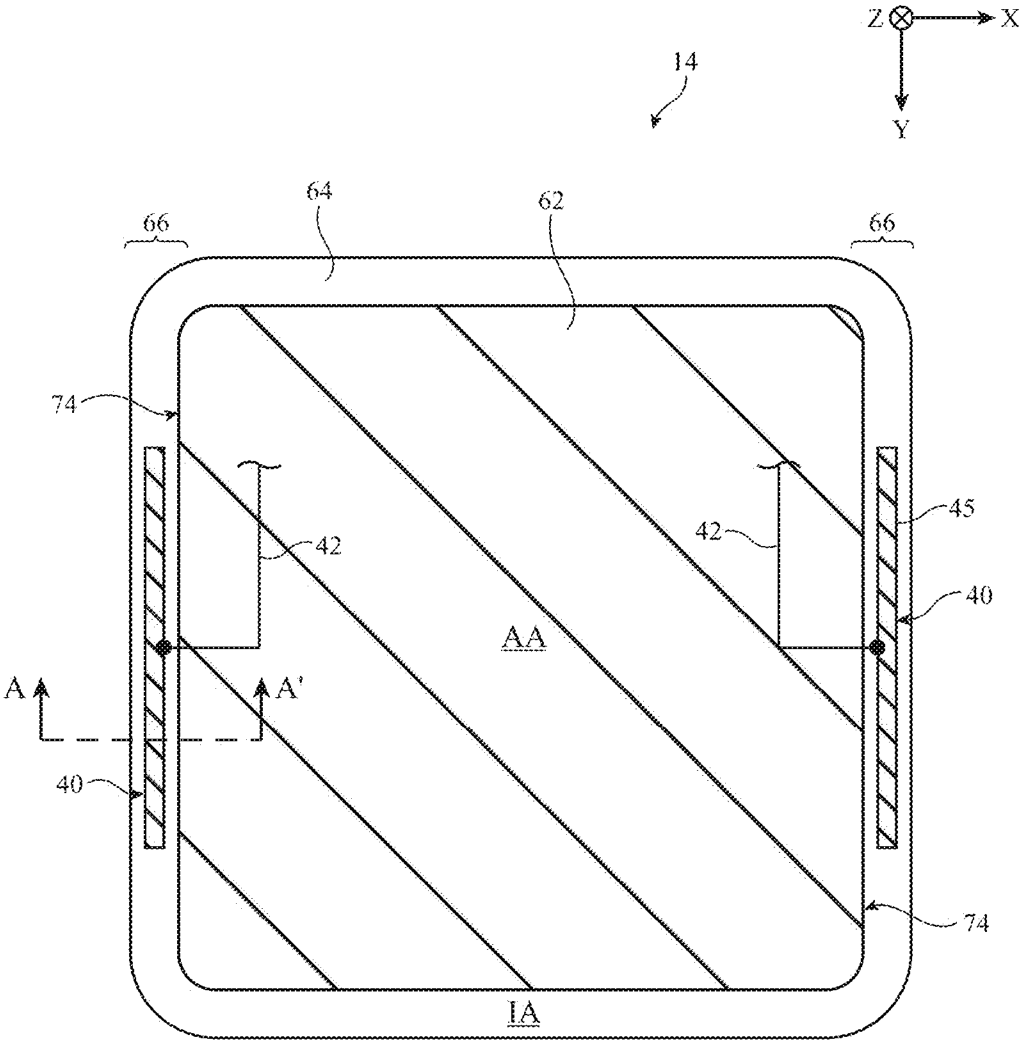
FIG. 5 is an interior rear view of an illustrative display that includes antennas aligned with inactive regions of the display in accordance with some embodiments.

FIG. 5 is an interior rear view of display 14 (e.g., as taken in the direction of arrow 72 of FIG. 4) showing one example of how antennas 40 in device 10 may be aligned with gap 66 and inactive area IA of display 14. As shown in FIG. 5, display cover layer 64 may overlap display panel 62. Display panel 62 may include conductive display structures overlapping active area AA of display 14. Inactive area IA of display 14 may extend in a ring shape to laterally surround the periphery of display panel 62 and may overlap gaps 66 (e.g., a peripheral portion of display cover layer 64 may protrude beyond lateral edges 74 of display panel 62 to overlap gaps 66).

One or more antennas 40 may be disposed in device 10 at locations overlapping gaps 66 and inactive area IA of display 14. In the example of FIG. 5, device 10 includes at least first and second antennas 40 at opposing left and right sides of display 14 (e.g., for supporting a MIMO scheme, antenna diversity, covering different frequency bands, etc.). Antennas 40 may have longitudinal axes that extend along gaps 66 parallel to lateral edges 74 of display panel 62 (e.g., parallel to the Y-axis). If desired, device 10 may include additional antennas 40 along the upper and/or lower edges of display 14 or may include only a single antenna 40 overlapping inactive area IA. Each antenna 40 may be fed using a corresponding transmission line path 42. Transmission line paths 42 may extend under display panel 62 and may couple antennas 40 to transceiver circuitry on a printed circuit board in device 10 such as a main logic board (MLB) (not shown).

Display panel 62 may be coupled to the MLB using a display connector and a flexible printed circuit, sometimes also referred to herein as a display flex (not shown). The display flex may convey display data to display panel 62 for display, may convey power to display 62, may convey touch and/or force sensor signals gathered by display panel 62 to the MLB, and/or may include ground traces. If desired, the display flex may also carry some or all of the transmission line paths 42 for antennas 40. Alternatively, some or all of one or more of the transmission line paths 42 for antennas 40 may be implemented on one or more flexible printed circuits that are different from the display flex.

Figure 6:
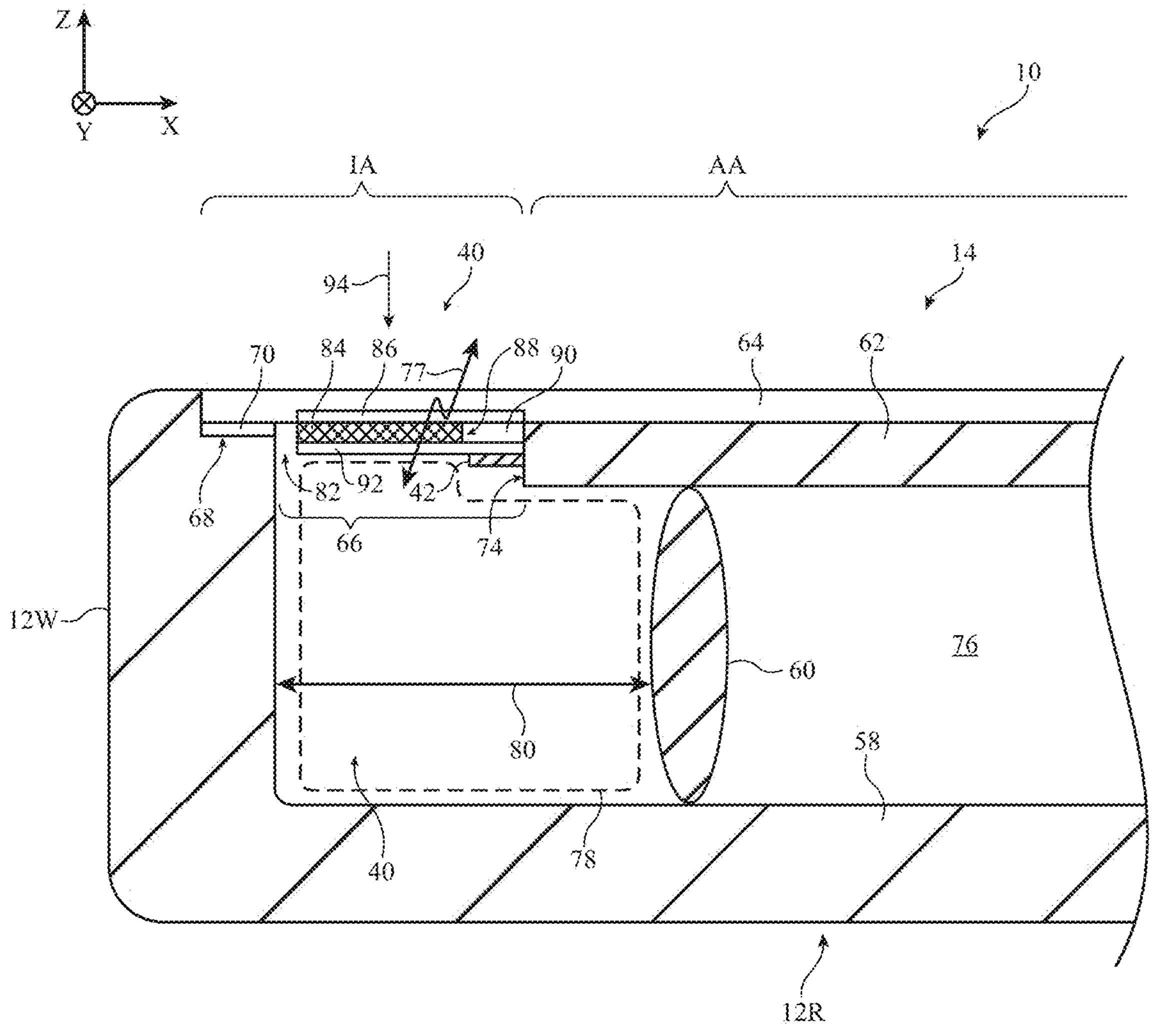
FIG. 6 is a cross-sectional side view of an illustrative antenna that includes a cavity-backed radiating slot between a mesh of conductors and a display panel in accordance with some embodiments.

FIG. 6 is a cross-sectional side view showing how one of the antennas 40 overlapping gap 66 and inactive area IA may be integrated into device 10 (e.g., as taken in the direction of line AA' of FIG. 4). As shown in FIG. 6, antenna 40 may include a mesh of conductors such as mesh 84 layered onto the interior surface of display cover layer 64 within gap 66 (e.g., overlapping inactive area IA). If desired, an opaque masking layer such as ink layer 86 may be disposed on the interior surface of display cover layer 64 between display cover layer 64 and conductive mesh 84 to help hide conductive mesh 84 from view. Ink layer 86 may be omitted if desired.

Mesh 84 may include an electrically conductive and optically transparent mesh of conductors that are patterned, layered, deposited, or otherwise disposed onto display cover layer 64. Mesh 84 is sometimes also referred to herein as grid 84 of conductors, lattice 84 of conductors, conductive mesh 84, or conductive lattice 84. The conductors in mesh 84 may be electrically continuous (e.g., galvanically connected together) and may surround and enclose an array of openings that are free of conductive material. Antenna current may flow along the conductors in mesh 84 while antenna 40 conveys radio-frequency signals. The electrical continuity of the conductors in mesh 84 may configure mesh 84 to be electrically opaque at radio-frequencies (e.g., may configure mesh 84 to act as a single continuous/contiguous piece of conductor at radio frequencies despite the presence of the array of openings in mesh 84, where antenna current flows along the outer edges of the single continuous/contiguous piece of conductor and follows the resonant conditions established by the geometry/dimensions of the antenna resonating element).

On the other hand, the array of openings in mesh 84 may configure mesh 84 to be optically transparent or translucent at visible wavelengths (e.g., configuring mesh 84 to transmit at least some light at optical wavelengths). The conductors in mesh 84 may be formed from copper or other conductive materials (e.g., metals). If desired, the conductors in mesh 84 may be formed from an optically transparent conductive material such as indium tin oxide (ITO) to further increase its optical transparency.

If desired, mesh 84 may be formed from a coating (e.g., a conductive thin-film coating or layer) that is layered onto display cover layer 64. The coating may have a thickness between 100 nm and 10 nm, between 75 nm and 25 nm, less than 25 nm, greater than 100 nm, between 0.1 mm and 0.5 mm, between 500 microns and 1 mm, between 1 and 500 microns, or between 1 and 1000 microns, as examples. The array of openings in mesh 84 may extend through the entire thickness of the coating if desired. The coating may include adhesive, epoxy, or other materials within the openings and/or overlapping the conductors in mesh 84 if desired. Mesh 84 may help to hide antenna 40 from being visible or distracting to a user through display cover layer 64, for example.

Mesh 84 may have a lateral edge 88. The lateral edge of mesh 84 opposite lateral edge 88 may be coupled (e.g., connected or electrically shorted) to peripheral conductive housing structures 12W. Alternatively, as shown in FIG. 6, the lateral edge of mesh 84 opposite lateral edge 88 may be laterally separated from peripheral conductive housing structures 12W by gap 82. Gap 82 may be sufficiently narrow so as to form a short circuit path between peripheral conductive housing structures 12W and conductive mesh 84 for current at the frequencies of operation of antenna 40. Put differently, conductive mesh 84 may be galvanically connected to peripheral conductive housing structures 12W or may be capacitively coupled to peripheral conductive housing structures 12W at radio frequencies.

Antenna 40 may include an antenna element such as slot 90. Slot 90 is sometimes also referred to herein as radiating slot 90, slot antenna resonating element 90, slot element 90, slot radiator 90, resonating slot 90, slot antenna radiating element 90, or slot antenna radiator 90. Lateral edge 88 of mesh 84 may be laterally separated from lateral edge 74 of display panel 62 by radiating slot 90. Radiating slot 90 may be indirectly fed by the transmission line path 42 for antenna 40. Transmission line path 42 may laterally extend under radiating slot 90 and may overlap radiating slot 90. If desired, antenna 40 may include a dielectric layer 92 that is vertically interposed between radiating slot 90 and transmission line path 42. Dielectric layer 92 may also extend under mesh 84 if desired. Dielectric layer 92 may be formed from adhesive (e.g., may be an adhesive layer), polymer, polyethylene terephthalate (PET), plastic, ceramic, and/or other dielectric materials. Transmission line path 42 may extend along a first side of dielectric layer 92 whereas mesh 84 and radiating slot 90 are disposed at a second side of dielectric layer 92. Dielectric layer 92 may help to hold or support transmission line path 42 in place overlapping radiating slot 90.

Mesh 84 and radiating slot 90 may overlap a radiating cavity 78 inside device 10. Radiating cavity 78 is sometimes also referred to herein as resonating cavity 78, resonant cavity 78, cavity back 78, or antenna cavity 78. Radiating cavity 78 backs radiating slot 90 (e.g., forms a cavity back for radiating slot 90). Conductive interconnect structure 60, illustrated as an ALG in the example of FIG. 6, may separate radiating cavity 78 from the rest of the interior 76 of device 10. The edges of radiating cavity 78 may be defined by conductive material in conductive interconnect structure 60, conductive rear wall 58, peripheral conductive housing structures 12W, and mesh 84 (e.g., radiating cavity 78 may be defined by the volume between conductive interconnect structure 60, conductive rear wall 58, peripheral conductive housing structures 12W, and mesh 84).

Radiating cavity 78 and radiating slot 90 may contribute to the radiative response of antenna 40 (e.g., the antenna resonating element 45 of FIG. 3 for antenna 40 may include radiating cavity 78 and radiating slot 90). For example, during signal transmission, transmission line path 42 may indirectly feed radiating slot 90 and may concurrently excite radiating cavity 78. Radiating slot 90 may radiate radio-frequency signals through display cover layer 64. At the same time, radiating cavity 78 may serve as a reflector for signals radiated by radiating slot 90. Electromagnetic signals excited by transmission line 42 may also resonate within radiating cavity 78 (e.g., according to the dimensions of radiating cavity 78) and back through gap 66 and radiating slot 90 in display 14. In sum, antenna 40 may radiate radio-frequency signals 77 through display cover layer 64 (within inactive area IA of display 14) due to the combination of radiative contributions (e.g., one or more resonances or modes) of both radiating slot 90 and radiating cavity 78. This process may be reversed during signal reception. When implemented in this way, antenna 40 may form a cavity-backed slot antenna (e.g., radiating slot 90 may be a cavity-backed radiating slot).

The dimensions of radiating slot 90 and radiating cavity 78 may be selected to configure antenna 40 to exhibit one or more desired resonances or electromagnetic modes at one or more frequencies (e.g., across one or more frequency bands handled by antenna 40). For example, radiating cavity 78 may have a width 80 (e.g., set by the placement of conductive interconnect structure 60 relative to peripheral conductive housing structures 12W) that configures radiating cavity 78 to contribute one or more electromagnetic resonant cavity modes at desired frequencies to the response of antenna 40. Increasing width 80 may, for example, serve to decrease the frequency of a fundamental mode resonance of radiating cavity 78 and antenna 40. If desired, radiating cavity 78 may also contribute one or more harmonic modes to the frequency response of antenna 40. Radiating cavity 78 may also help to increase the gain of antenna 40 and/or may help to optimize the directionality and/or shape of the radiation pattern of antenna 40.

Figure 7:
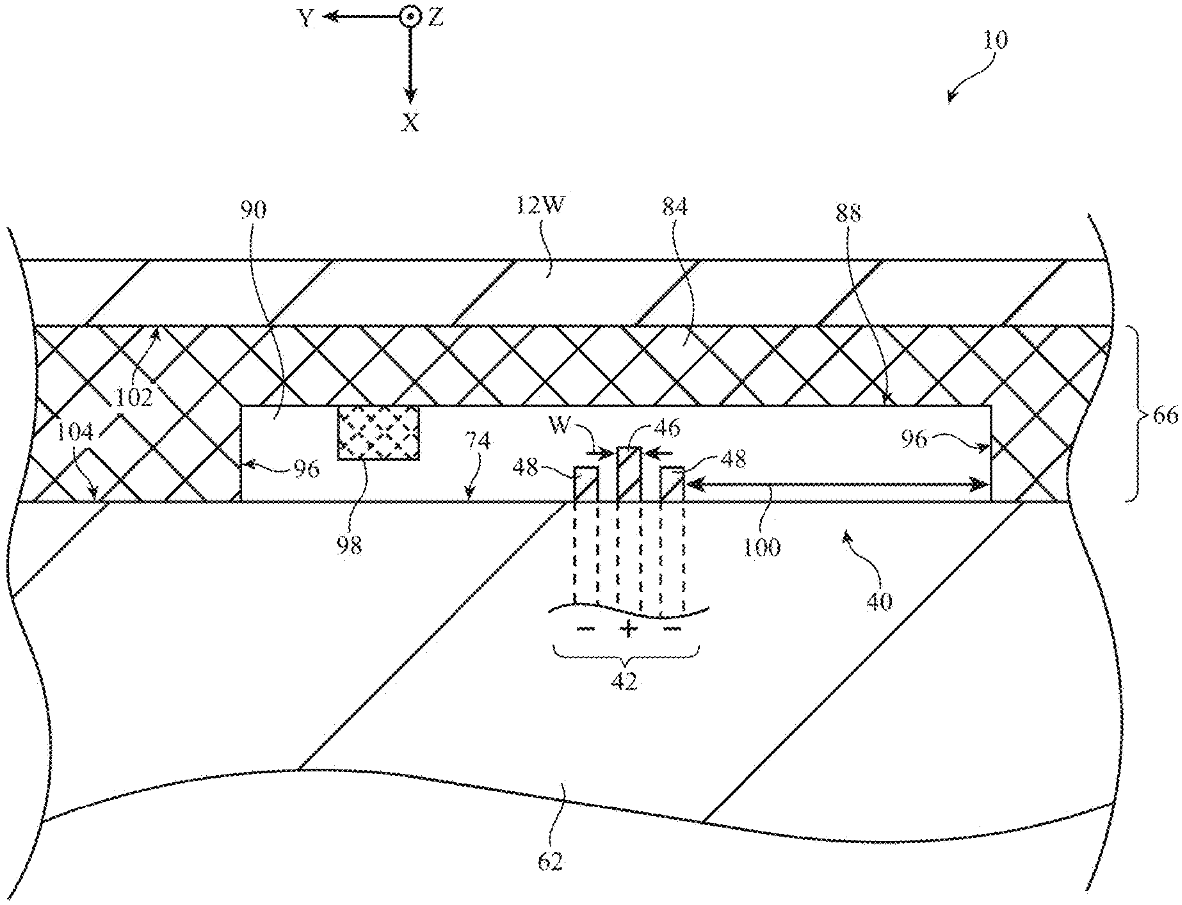
FIG. 7 is a top view of an illustrative antenna that includes a cavity-backed radiating slot between a mesh of conductors and a display panel in accordance with some embodiments.

FIG. 7 is a top-down view of radiating slot 90 in antenna 40 (e.g., as taken in the direction of arrow 94 of FIG. 6). In the example of FIG. 7, display cover layer 64, dielectric layer 92, and rear housing wall 12R have been omitted for the sake of clarity. In the example of FIG. 7, mesh 84 has a lateral edge 102 that is coupled or connected to peripheral conductive housing structures 12W. Alternatively, mesh 84 may be separated from peripheral conductive housing structures 12W by gap 82 (FIG. 6). Mesh 84 may have a lateral edge 104 opposite lateral edge 102. Lateral edge 104 may be coupled, connected, and/or electrically shorted to lateral edge 74 of display panel 62. Alternatively, lateral edge 104 may be separated from lateral edge 74 by a gap that is sufficiently narrow so as to form a short circuit impedance at the frequencies of operation of antenna 40.

As shown in FIG. 7, radiating slot 90 may be formed between mesh 84 and display panel 62. Radiating slot 90 may, for example, have a first edge defined by lateral edge 88 of conductive mesh 84. Radiating slot 90 may have a second edge opposite the first edge, defined by lateral edge 74 of display panel 62. Radiating slot 90 may have opposing third and fourth edges 96 extending from the first edge to the second edge of radiating slot 90. In this example, radiating slot 90 is a closed slot that is surrounded on all sides by conductive material held at a ground potential.

Radiating slot 90 may have a length given by the distance between edges 96. The length may be selected to contribute a fundamental mode resonance and/or one or more harmonic mode resonances at desired frequencies to the response of antenna 40 (e.g., in addition to any resonant modes contributed by the underlying radiating cavity 78 of FIG. 6). In a fundamental mode, the length may, for example, be approximately equal to one-half the effective wavelength of radiation of radiating slot 90 (e.g., where effective wavelength is given by the free space wavelength multiplied by a constant associated with the dielectric materials in and/or around radiating slot 90).

Transmission line path 42 may protrude beyond display panel 62 to overlap radiating slot 90. In the example of FIG. 7, transmission line path 42 is a coplanar waveguide having a signal conductor (trace) 46 that is coplanar with and interposed between two ground conductors (traces) 48. Signal conductor 46 may indirectly feed radiating slot 90 via near-field electromagnetic coupling. This may produce or excite an antenna current to flow around the perimeter of radiating slot 90, through mesh 84 along edges 88 and 96 and through lateral edge 74 of display panel 62. The antenna current flowing around radiating slot 90 and/or signal conductor 46 itself may concurrently excite one or more radiating modes of radiating cavity 78 (FIG. 6). This process may be reversed during signal reception by antenna 40. Feeding antenna 40 using a coplanar waveguide may serve to minimize the vertical space required to feed antenna 40 (e.g., parallel to the Z-axis), helping to minimize the total thickness of device 10 and/or allowing room for other components within device 10.

Electrically coupling lateral edge 102 of mesh 84 to a conductor held at a ground potential such as peripheral conductive housing structures 12W and electrically coupling lateral edge 104 of mesh 84 to a conductor held at ground potential such as peripheral conductive housing structures 12W (e.g., where the electrical couplings are galvanic connections or capacitive couplings forming short circuit paths at radio frequencies) may, for example, serve to maximize antenna current strength around the perimeter of radiating slot 90 and thus the electric field strength produced by radiating slot 90 and the overall gain and/or antenna efficiency of antenna 40.

Signal conductor 46 may have a lateral width W. Width W may be selected to perform impedance matching for the fundamental mode and/or to increase the bandwidth of radiating slot 90. Width W may be, for example, 2 mm, 6 mm, 10 mm, 2-6 mm, 1-15 mm, or other widths. A relatively high width such as 6-12 mm may serve to maximize the bandwidth of radiating slot 90 for a fundamental mode response between around 2000 MHz and around 3200 MHZ, as one example.

Transmission line path 42 may be laterally separated from an edge 96 of radiating slot 90 by distance 100. Distance 100 may be selected to perform impedance matching for one or more radiating modes of radiating slot 90 (e.g., in 2.4 GHZ, 5.2 GHZ, and/or 6.6 GHz bands). Distance 100 may be, for example, 0-25 mm.

If desired, mesh 84 may include one or more stubs 98 that extend or protrude into radiating slot 90 along lateral edge 88 and/or one of lateral edges 96. The placement and dimensions of stub 98 may be selected to adjust the impedance loading or matching of antenna 40 (e.g., for tuning the response of antenna 40 to cover 2.4 GHz and 5 GHz Wi-Fi bands). Stub 98 may have a length (parallel to the X-axis) of between 0 mm and 5 mm, as an example. In general, width W, distance 100, the placement of stub 98, and/or the dimensions of stub 98 may be selected to optimize the efficiency of radiating slot 90 and thus antenna 40 in one or more frequency bands.

The example of FIG. 7 is illustrative and non-limiting. In general, radiating slot 90 may have any desired shape having any desired number of curved and/or straight edges. Slot 90 need not be linear and may, in general, follow any desired path (e.g., a bent, angled, or meandering path) having any desired number of curved and/or straight segments extending at any desired angles with respect to each other.

Figure 8:
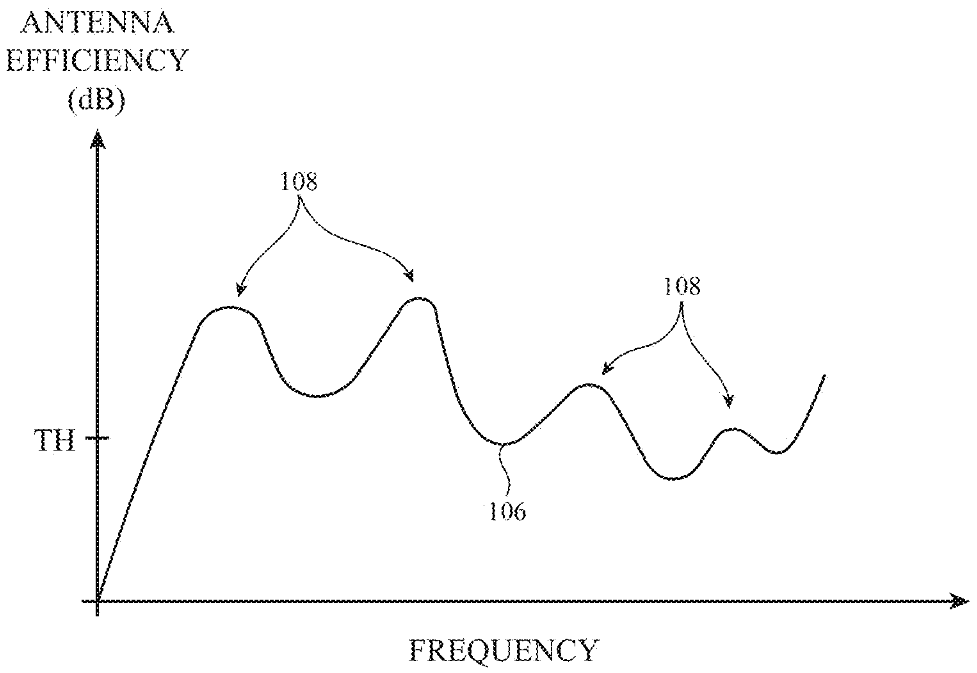
FIG. 8 is a plot of antenna performance (efficiency) as a function of frequency for an illustrative antenna of the type shown in FIGS. 6 and 7 in accordance with some embodiments.
Figure 9:
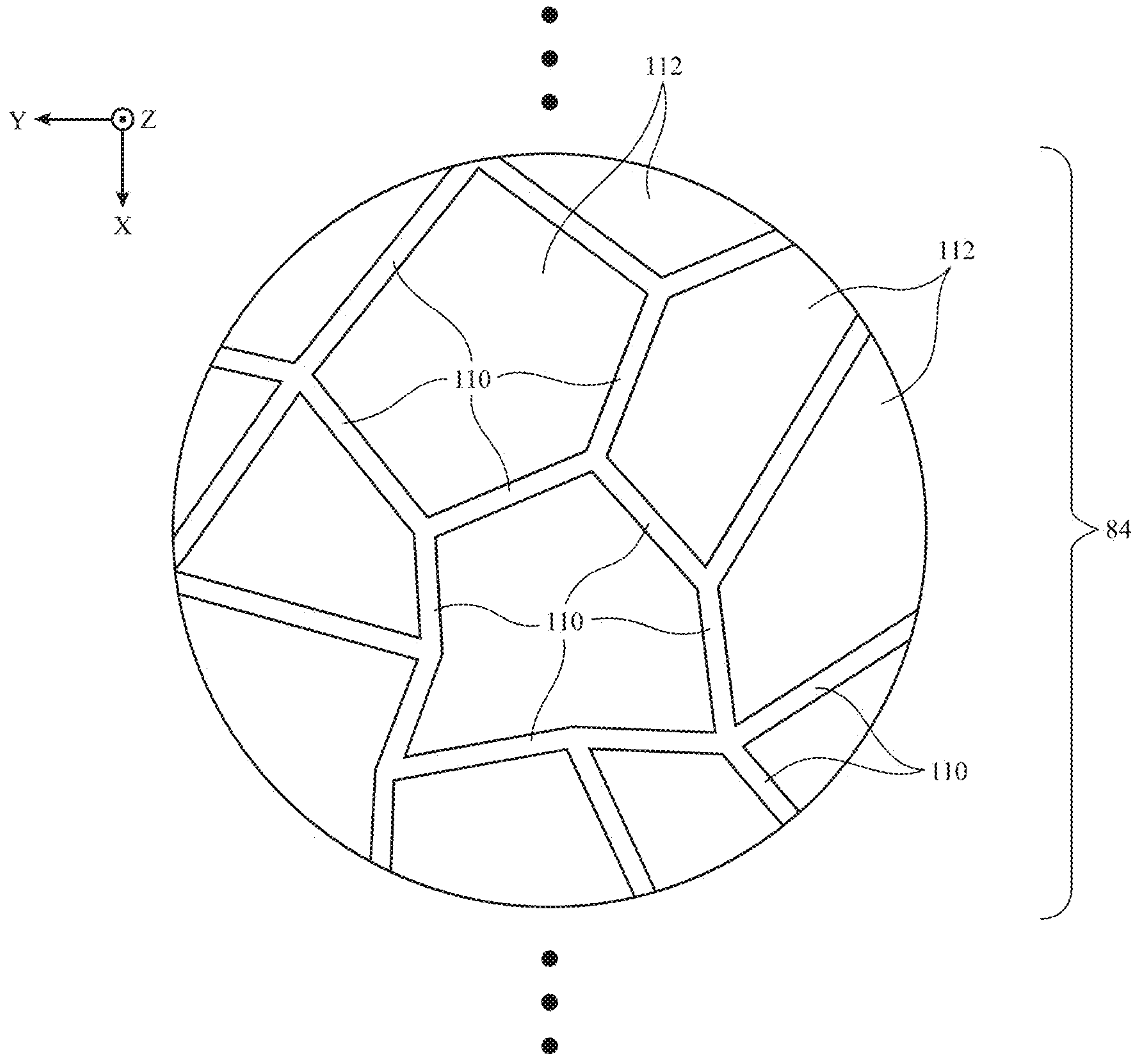
FIG. 9 is an exploded front view of an illustrative mesh of conductors that may be used in forming a cavity-backed radiating slot in accordance with some embodiments.

FIG. 8 is a plot of antenna performance (efficiency) as a function of wavelength for antenna 40 (e.g., between around 2000 MHz and 8000 MHz or other frequencies). As shown by curve 106 in FIG. 8, antenna 40 may exhibit an antenna efficiency that exceeds a minimum threshold efficiency TH (e.g., −10 dB, −8 dB, −6 dB, etc.) across one or more frequency bands. Curve 106 may exhibit one or more efficiency peaks 108 (e.g., response or resonant peaks). The dimensions of radiating slot 90, distance 100, width W, the placement and dimension of stub(s) 98 (FIG. 7), and the dimensions of radiating cavity 78 (FIG. 6) may be selected to tune the number and frequencies of peaks 108 to cover any desired frequency bands with efficiency exceeding threshold TH. Curve 106 may have other shapes in practice.

FIG. 8 is an exploded view of mesh 84 in antenna 40. As shown in FIG. 8, mesh 84 may include a mesh, grid, or lattice of intersecting conductors 110 deposited onto a lateral surface of an underlying substrate (e.g., dielectric cover layer 64). Conductors 110 are sometimes also referred to herein as conductive segments 110, conductive lines 110, or conductive traces 110. Conductors 110 may be formed from copper, nickel, gold, silver, and/or other metals or alloys. Alternatively, conductors 110 may be formed from an optically transparent conductive material such as ITO.

Conductors 110 may laterally surround an array of openings 112 at the lateral surface of the underlying substrate (e.g., a non-uniform array of openings 112). Openings 112 are sometimes also referred to herein as slots 112, gaps 112, conductor-free regions 112, or holes 112 and are free from conductive material (e.g., openings 112 extend through the entire thickness of the coating forming mesh 84, parallel to the Z-axis). Openings 112 may be filled with dielectric material (e.g., polymer, epoxy, adhesive, etc.) or may be void of material. The dimensions of openings 112 and conductors 110 may be selected to adjust the inductance of conductors 110, to tweak the radiating characteristics of antenna 40, and/or to adjust the visible opacity/transparency of mesh 84. Each conductor 110 may be, for example, 0.01-0.5 mm in length. Different conductors 110 may be different lengths. Conductors 110 may be straight (linear) and/or may be curved.

The size and shape of each opening 112 is defined by the conductors 110 surrounding that opening 112. In general, openings 112 may have any desired shape and/or size. Openings 112 may be square, rectangular, hexagonal, circular, elliptical, polygonal, etc. If desired, different openings 112 may have different sizes and/or shapes. In some implementations that are described herein as an example, mesh 84 may be provided with a non-uniform or randomized pattern of conductors 110 and/or openings 112. Put differently, the lengths and/or widths of conductors 110, the angle/orientation of conductors 110, the number of sides of openings 112, the sizes of openings 112, and/or the shapes of openings 112 may non-uniformly, randomly, or pseudo-randomly distributed (e.g., may non-uniformly, randomly, or pseudo-randomly vary) across the lateral area of mesh 84 and antenna 40 (FIG. 7). When configured in this way, openings 112 are arranged in a non-rectangular and/or non-uniform array pattern (rather than in a fixed pattern of rows and columns). Randomly distributing conductors 110 and openings 112 may serve to minimize the amount of visible light that is diffracted by mesh 84 (e.g., may prevent conductors 110 from forming a diffractive grating at optical wavelengths, may disrupt a Bragg-matching condition at mesh 84, etc.). This may help to make mesh 84 and antenna 40 more difficult for a user to see, perceive, or notice through display cover layer 64. Alternatively, conductors 110 and openings 112 may be arranged in a uniform grid or array pattern.

Each conductor 110 is electrically (e.g., galvanically) coupled or connected to every other conductor 110 in mesh 84 either directly or via one or more other conductors 110 (e.g., because the conductors 110 in mesh 84 are intersecting). Put differently, conductors 110 may form short circuit (e.g., zero) impedances at radio frequencies between each of the other conductors 110 in mesh 84. As such, when antenna 40 conveys radio-frequency signals, antenna current flows through the conductors 110 in mesh 84 and around the lateral edges of radiating slot 90 (FIG. 7) as if mesh 84 were a single continuous/contiguous piece of conductive material that defines the edges of radiating slot 90. At the same time, openings 112 may allow at least some visible light to pass through mesh 84, helping to minimize the amount of visible light blocked or scattered by antenna 40 and helping to minimize the visibility of antenna 40.

As used herein, the term “concurrent” means at least partially overlapping in time. In other words, first and second events are referred to herein as being “concurrent” with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term “while” is synonymous with “concurrent.”

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:
- a display cover layer;
- a display panel mounted to the display cover layer and configured to display images through the display cover layer;
- a conductive mesh layered onto the display cover layer; and
- an antenna that includes a radiating slot with a first edge and a second edge opposite the first edge, wherein the first edge is defined by the display panel and the second edge is defined by the conductive mesh.

2. The electronic device of claim 1, further comprising:
- peripheral conductive housing structures separated from the display panel by an opening, the display cover layer being mounted to the peripheral conductive housing structures, and the conductive mesh being disposed within the opening.

3. The electronic device of claim 2, wherein the conductive mesh is separated from the peripheral conductive housing structures by a gap, the gap forming a short circuit impedance between the conductive mesh and the peripheral conductive housing structures at an operating frequency of the antenna.

4. The electronic device of claim 2, wherein the conductive mesh is coupled to the peripheral conductive housing structures.

5. The electronic device of claim 2, further comprising:
- a conductive housing wall coupled to the peripheral conductive housing structures opposite the display; and
- a conductive interconnect that couples the conductive housing wall to the display panel.

6. The electronic device of claim 5, wherein the antenna comprises:
- a radiating cavity overlapping the radiating slot, the radiating cavity having edges defined by the conductive housing wall, the conductive mesh, the peripheral conductive housing structures, the conductive interconnect, and the display panel.

7. The electronic device of claim 6, wherein the radiating slot is configured to contribute a first resonant mode to the antenna at a first frequency and the radiating cavity is configured to contribute a second resonant mode to the antenna at a second frequency.

8. The electronic device of claim 6, wherein the conductive interconnect comprises an air loop gasket.

9. The electronic device of claim 1, further comprising:

a coplanar waveguide overlapping the radiating slot and configured to excite one or more electromagnetic modes of the radiating slot.

10. The electronic device of claim 9, further comprising:

a dielectric layer that overlaps the conductive mesh and that is interposed between the coplanar waveguide and the radiating slot.

11. The electronic device of claim 9, wherein the conductive mesh comprises a stub that protrudes into the radiating slot from the second edge.

12. The electronic device of claim 1, wherein the conductive mesh comprises a mesh of intersecting conductors laterally surrounding an array of openings.

13. The electronic device of claim 12, wherein the intersecting conductors have lengths between 0.01 mm and 0.5 mm and the conductive mesh is transparent to light at visible wavelengths.

14. The electronic device of claim 12, wherein the openings in the array of openings have dimensions that vary across a lateral area of the conductive mesh.

15. The electronic device of claim 12, wherein the conductors comprise copper or indium tin oxide.

16. An electronic device comprising:

peripheral conductive housing structures;

a display cover layer mounted to the peripheral conductive housing structures;

a display panel mounted to the display cover layer and configured to display images through the display cover layer;

an antenna that includes a slot between a lateral edge of the display panel and the peripheral conductive housing structures; and an optically transparent mesh of conductors layered onto the display cover layer and defining an edge of the slot.

17. The electronic device of claim 16, further comprising:

a conductive housing wall opposite the display cover layer; and an air loop gasket that couples the conductive housing wall to the display panel, wherein the antenna further includes a cavity overlapping the slot and having edges defined by the air loop gasket, the conductive housing wall, the display panel, and the peripheral conductive housing structures, and the coplanar waveguide is configured to excite a resonant mode of the cavity.

18. An antenna comprising:

a radiating slot having a first edge defined by conductive structures in a display, a second edge opposite the first edge, and third and fourth edges that couple the first edge to the second edge, wherein the first, second, and third edges are defined by a mesh of conductors on a dielectric layer; and a radiating cavity overlapping the radiating slot, wherein the conductive structures in the display and the mesh of conductors define at least one edge of the radiating cavity.

19. The antenna of claim 18, further comprising:

a coplanar waveguide that is layered onto the dielectric layer, that overlaps the radiating slot, and that is configured to excite a first electromagnetic mode of the radiating slot and a second electromagnetic mode of the radiating cavity.

20. The electronic device of claim 16, further comprising:

a coplanar waveguide that overlaps the slot and that is configured to excite a resonant mode of the slot.

* * * * *